Patented Sept. 20, 1949

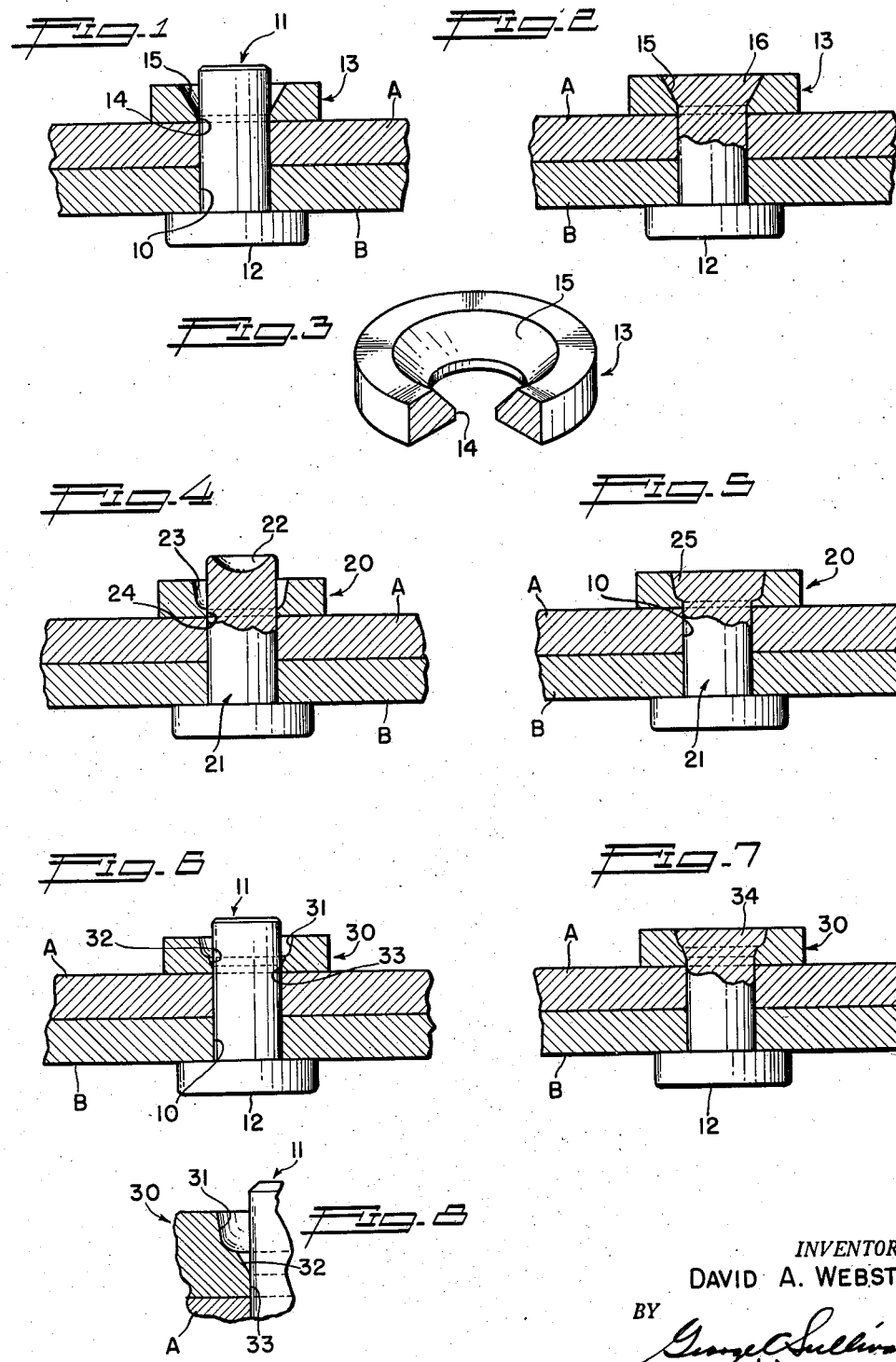

2,482,391

UNITED STATES PATENT OFFICE 2,482,391

FASTENER UNIT

David A. Webster, San Diego, Calif., assignor to Lockheed Aircraft Corporation, Burbank, Calif.

Application January 24, 1945, Serial No. 574,248

1 Claim. (Cl. 85—37)

This invention relates to securing and fastening devices and relates more particularly to such devices of the rivet and bolt class.

In many instances modern designs and operating conditions require structural connecting and fastening devices having greater tensile and shear strength than the devices heretofore employed. For example, in the fabrication of aircraft, conventional rivets are becoming inadequate in certain installations and it is necessary to resort to stronger fastening devices. Bolts and nuts are frequently used in such cases to obtain the required strength. The installation of bolts is time consuming and therefore costly, and the bolts and nuts add materially to the weight of the assembly. Furthermore, the tensile strength of a bolt is never greater than that of its threaded portion. In a typical bolt the cross sectional area of the shank is reduced about 35% by reason of the thread, and the provision of the thread proportionately reduces the tensile strength and impairs the fatigue strength. Rivets have been introduced in which a collar is forced into a groove in the shank or stud to form the securing head. This type of rivet has a shear strength greater than a bolt of equal diameter, but by the very nature of the groove and formed head arrangement the tensile strength is appreciably lower than that of a bolt having the same diameter.

A general object of this invention is to provide a fastener unit in which both the full tensile strength and full shear strength of the stud are obtained. The device of the present invention does not necessitate the provision of a thread in the stud or the reduction of the cross sectional area of the stud by providing a groove therein. The fastener unit embodies a stud of full diameter throughout that portion which passes through the structural parts with a manufactured head at one end and a formed head at the other end designed and proportioned to adequately assume full tensile loads. The ultimate shear strength of the device is equal to that of a bolt of the same size and material and a tensile strength is obtained which is substantially greater than that of a bolt of comparable diameter.

Another object of the invention is to provide a fastener unit in which the expansion, or amount of up-setting, of the stud is accurately controlled to obtain optimum strength characteristics. It is a feature of the invention that a minimum upset head size consistent with full tensile strength is assured. Thus the amount of upsetting or expansion of the rivet-like stud is reduced to a minimum for a given sheet bearing area in tension. The expansion is controlled by a retaining collar arranged around the shank, to bear on the sheets or a structural part, and having a recess for receiving and limiting the expanded portion of the stud. The limited expansion is of particular advantage where the stud is formed of high strength material that is difficult to up-set or expand to a sufficient extent for adequate head bearing area on the sheet or work part. The retainer collar presents ample bearing surface for contacting the sheet and assures distributed loading with little or no indenting of the sheet while utilizing to the best advantage the upset head of minimum dimensions.

It is another object of the invention to provide a fastener of the character referred to in which the recess of the retainer collar is designed to facilitate ready adequate expansion and shaping of the stud head with a minimum of driving load or impact.

It is another object of the invention to provide a fastener unit of the class mentioned wherein the recess of the retainer collar is shaped and proportioned to obtain a tensile strength at the up-set stud portion equal to that of the shank of the stud without danger of fracturing or distorting the collar.

A further object of the invention is to provide a fastening device that does not necessitate the employment of special driving tools or rivet sets, and that may be easily and quickly driven. The recess of the retainer collar may be shaped to facilitate driving by either the multiple impact method or the constant load method of rivet driving. The construction is such that mere visual inspection immediately indicates whether the stud has been driven to the required extent.

A still further object of the invention is to provide a fastener unit that is inexpensive to manufacture and install, and that is light in weight.

Other objects and features of the invention will be readily understood from the following detailed description of typical preferred forms of the invention wherein reference will be made to the accompanying drawings in which:

Figure 1 is a fragmentary sectional view of a pair of sheets showing the stud and retainer collar of the invention in position for the driving of the stud;

Figure 2 is a view similar to Figure 1 showing the stud in the driven or expanded condition;

Figure 3 is an enlarged perspective view of the retainer collar shown in Figure 1 with a portion broken away;

Figure 4 is a view similar to Figure 1 illustrating another form of retainer collar;

Figure 5 is a view similar to Figure 2 showing the stud up-set in the collar of Figure 4;

Figure 6 is a view similar to Figure 1 illustrating still another form of a retainer collar.

Figure 7 is a view similar to Figure 2 showing the stud up-set into the collar of Figure 6; and Figure 8 is an enlarged fragmentary sectional view of the assembly shown in Figure 6.

The fastener units of the invention may be varied in design and construction to adapt them for specific applications. In the drawings I have shown three typical embodiments of the invention employed to secure together superimposed parts A and B which will hereinafter be termed sheets, it being understood that this is not to be construed as limiting either the scope or application of the invention. The structural parts or sheets A and B are arranged in face-to-face superimposed relation and have registering transverse openings 10 for the reception of the securing member or stud.

The fastening device of Figures 1, 2 and 3 comprises a body or stud 11 having a head 12 at one end for bearing on the surface of sheet B, and a retainer collar 13 for bearing on the surface of the sheet A designed to receive and confine the up-set or driven portion of the stud 11.

The stud 11 is initially a simple, cylindrical member provided at one end with an appropriate head 12. The stud is proportioned to be readily passed through the openings 10 of the work parts or sheets to have its plain end portion project beyond the sheet A when the head 12 is in cooperation with the sheet B. I have shown a simple, flat, cylindrical head 12, it being understood that the stud may be provided with a countersink head, a brazier head or a round head as conditions of use require. The stud 11 may be constructed of any selected material. For example, it may be formed of steel, steel alloy, aluminum alloy, etc. In this connection it is to be understood that the stud 11 may be formed of a material of a hardness that precludes successful use in conventional riveting practice where the up-setting of the rivet is uncontrolled.

The retainer collar 13 is a simple disc-like member of steel, aluminum alloy or other selected material. The outside diameter of the collar may vary as conditions of use indicate. However, in most applications it has been found desirable to employ a collar having an outside diameter approximately two and one-half times the diameter of the stud 11. The inner surface of the collar 13 is preferably flat and normal to the longitudinal axis of the stud 11 to evenly bear on the sheet A. The outer face of the collar 13 may likewise be flat and may be parallel with the inner face. A central opening 14 enters the collar 13 from its inner surface to receive or pass the stud 11. The opening 14 is cylindrical and of such diameter that it has engagement with the stud to maintain the collar in concentric relation to the stud and to resist outward movement of the collar during driving of the stud. The opening 14 is preferably relatively short in relation to the thickness of the collar but is of sufficient length to provide ample stock at the inner portion of the collar to prevent fracturing and distorting of the collar when the stud is driven.

A recess 15 is provided in the collar 13 to receive and limit the up-set portion of the stud 11. In this form of the invention the recess 15 is frusto-conical, having a continuous circular wall flaring outwardly from the opening 14 to the outer surface of the collar. The capacity of the recess 15 determines the maximum extent of upsetting of the stud 11 and the configuration of the recess, coupled with its capacity, determines the tensile strength of the fastener device. It has been found that by giving the wall of recess 15 an included angle of from 60° to approximately 66°, and by making the depth of the recess 15, slightly less than one-half the diameter of the stud, the headed-up or up-set stud portion 16 bearing in the retainer collar has a tensile strength equal to or comparable with that of the stud body. The outside diameter of the collar 13 may be substantially the same as that of a conventional washer used on a bolt of substantially the same diameter as the stud 11. The overall dimensions of the retainer collar 13 may vary materially in different applications of the invention.

In employing the fastening means of Figures 1, 2 and 3, the stud 11 is first inserted through the openings 10 of the sheets A and B to have its head 12 engage with the face of a sheet. The retainer collar 13 is then slipped over the protruding portion of the stud to engage with the other sheet. In driving or up-setting the stud any suitable equipment or tools may be used. With this particular form of the invention it is preferred to employ a multiple impact type rivet gun or the equivalent, to drive the stud. A simple, flat rivet set is all that is required in driving the stud and a suitable bucking bar is applied to the head 12 during the driving operation. The initial length of the stud 11 is related to the volume or capacity of the recess as well as to the thickness of the sheets A and B and the thickness of the collar 13 to provide for complete filling of the recess 15 by the up-set stud portion 16 to leave the face of the up-set stud flush with the outer surface of the collar. Figure 2 illustrates the stud driven so that its up-set portion 16 completely occupies the recess 15 to have its surface flush with the end face of the collar. Inspection of the device is particularly easy. If the up-set end of the stud 11 is flush with the face of the collar 13, it is a definite indication that the recess 15 is completely occupied and a thoroughly dependable connection has been made. Over-driving of the stud is almost completely avoided, and under-driving is immediately apparent by mere visual inspection. It has been found that the upsetting or driving of the stud 11 results in a slight expansion of the shank portion providing a tight fit of the stud in the openings 10 and avoids the necessity for reaming the openings. The frusto-conical configuration of the recess further assures drawing down of the collar and head 12 against their respective sheets.

From an inspection of Figure 2 of the drawings it will be apparent that the stud 11 has full shear strength, and where the up-set portion 16 is confined and shaped by the recess 15 as above described, full tensile strength of the stud is developed. It is to be observed that full tensile strength is obtained with a minimum of expansion of the stud, thus permitting the employment of hard or relatively hard material in the fabrication of the stud.

Figures 4 and 5 illustrate a type of retainer collar 20 which adapts the fastener unit for driving by the "squeezer" or constant pressure type of driving equipment. The stud 21 may be the same as the stud 11 described above. I have shown the plain end of the stud 21 provided with a central depression 22 to facilitate the expansion of the end portion when it is driven. The collar 20 may be the same as the above described collar 13 except for the special formation or shape of its recess 23. The collar 20 has a central cylindrical opening 24 of limited length to center the collar on the stud and to leave ample stock at the bottom of the recess 23 and thus preclude fracture or distorting of the collar at this point. In this form of the invention the recess 23 is substantially cup shaped, having a side wall which slopes inwardly from the outer face of the collar 20 at a small angle, say, 10°. At its inner or bottom portion the wall of the recess 23 curves substantially radially inward to join the opening 24. It will be observed that the inner or bottom wall of the cup-like recess 23 is of limited area. In this construction, as in the form described above, the recess 23 is shaped and proportioned to receive an up-set portion 25 of the stud of sufficient size and of such shape as to develop full tensile strength of the stud. The recess 23 definitely limits expansion of the stud and is shaped to allow such expansion by the constant pressure type of driving equipment. The stud 21 is initially proportioned so that the expanded part 25 completely occupies the recess 23 to have its surface flush with the end of the collar 20 when the stud is properly driven. It is practically impossible to over-drive the stud and under-driving is immediately apparent. The shank of the stud 21 expands slightly to tightly fit the openings 19 upon driving of the stud.

In Figures 6, 7 and 8 of the drawings I have illustrated a type of retainer collar 30 which adapts the stud 11 for driving either by the multiple impact type of equipment or by the constant pressure type of device. In this construction the stud 11 may be the same as described above and the collar 30 is similar to the above described collar 20. The recess 31 of the collar 30 is generally cup shaped, being similar to the recess 23. A frusto-conical inner socket or recess 32 continues inwardly from the bottom of the socket 31 and ultimately merges with the wall of the cylindrical opening 33. The major recess 31 has a depth slightly less than the above described recess 23. The opening 33 may be the same as the above described openings 14 and 24. It has been found that the combination of the cup shaped recess 31 of limited depth and the continuing frusto-conical recess 32 permits free flow of the metal during driving of the rivet. When the stud 11 is driven by the squeezer or constant pressure type of device, the metal first fills the rather limited frusto-conical recess 32 and this initial flow apparently aids in inducing the major flow of metal into the larger recess 31. Where the multiple impact type of driving device is employed, a somewhat similar action takes place. It is to be understood that the recess 31 with its tapering extension 32 is shaped and proportioned to receive a given volume of the stud material and to give the fastener unit the optimum tensile strength. The up-set portion 34 occupying the recesses 31 and 32 has its outer surface flush with the face of the collar 30 when the stud has been properly driven. Such driving of the stud draws the stud head and collar 30 into tight engagement with the sheets A and B.

It will be seen that I have provided a fastener unit embodying means for limiting the expansion of the up-set stud head to a minimum commensurate with full shank tensile strength. The shank of the stud is not reduced in cross sectional area by screw threads, grooves, or the like, and full shear and tensile strengths are obtained. The restriction of the stud head up-setting to a minimum without sacrificing tensile strength speeds up the driving operation, assures more uniform results, and permits the use of hard or relatively hard materials in forming the stud.

Having described only typical forms of the invention, I do not wish to be limited to the specific details herein set forth, but wish to reserve to myself any variations or modifications that may appear to those skilled in the art or fall within the scope of the following claim.

I claim:

A fastener comprising a stud having a shank and a head on one end of the shank, and a collar having an opening presenting a cylindrical wall for engaging around said shank and having a generally cup shaped recess defined by a wall flaring outwardly from said opening, then extending generally radially with respect to said opening and then flaring slightly to the outer end of the collar, the recess being adapted to be filled by the other end portion of the shank when the same is upset and being proportioned so that the portion upset therein is adapted to assume an axial load of the same order as the tensile strength of the shank.

DAVID A. WEBSTER.

REFERENCES CITED

The following references are of record in the file of this patent:

UNITED STATES PATENTS

| Number | Name | Date |
| --- | --- | --- |
| 221,447 | Cornell | Nov. 11, 1879 |
| 555,137 | Waters | Feb. 25, 1896 |
| 642,375 | Simpson | Jan. 30, 1900 |
| 1,273,588 | Donnelly | July 23, 1918 |
| 1,292,069 | Robinson | Jan. 21, 1919 |

FOREIGN PATENTS

| Number | Country | Date |
| --- | --- | --- |
| 340,219 | France | May 6, 1904 |